(12) United States Patent
Handte et al.

(10) Patent No.: US 12,500,692 B2
(45) Date of Patent: Dec. 16, 2025

(54) TRANSMISSION APPARATUS AND METHOD, RECEIVING APPARATUS AND METHOD FOR LATENCY REDUCTION USING FEC PACKETS AT MAC LAYER

(71) Applicant: Sony Corporation, Tokyo (JP)

(72) Inventors: Thomas Handte, Stuttgart (DE); Dana Ciochina, Stuttgart (DE); Nabil Sven Loghin, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 692 days.

(21) Appl. No.: 17/263,563

(22) PCT Filed: Aug. 1, 2019

(86) PCT No.: PCT/EP2019/070820
§ 371 (c)(1),
(2) Date: Jan. 27, 2021

(87) PCT Pub. No.: WO2020/025768
PCT Pub. Date: Feb. 6, 2020

(65) Prior Publication Data
US 2021/0152284 A1 May 20, 2021

(30) Foreign Application Priority Data

Aug. 3, 2018 (EP) ..................................... 18187250

(51) Int. Cl.
*H04L 1/00* (2006.01)
*H04W 72/044* (2023.01)
(52) U.S. Cl.
CPC .......... *H04L 1/0057* (2013.01); *H04L 1/0041* (2013.01); *H04W 72/0466* (2013.01)

(58) Field of Classification Search
CPC ... H04L 1/0057; H04L 1/0041; H04L 1/0045; H04L 1/1628; H04L 1/189; H04L 1/0058;
(Continued)

(56) References Cited

U.S. PATENT DOCUMENTS 8,824,682 B2 * 9/2014 Hypponen ............ H04L 9/0894
380/277
9,021,341 B1 * 4/2015 Srinivasa ............... H04L 1/0033
714/790
(Continued)

OTHER PUBLICATIONS

Kai-Ten Feng et al: "Design of MAC-defined aggregated ARQ schemes for IEEE 802.11n networks", Wireless Networks, ACM, 2 Penn Plaza, Suite 701—New York USA, vol. 17, No. 3, Apr. 1, 2011 (Apr. 1, 2011 ), pp. 685-699.
(Continued)

*Primary Examiner* — Thuong Nguyen
(74) *Attorney, Agent, or Firm* — XSENSUS LLP

(57) ABSTRACT

A transmission apparatus for use in a communication system comprises MAC layer processing circuitry and PHY layer processing circuitry. The MAC layer processing circuitry is configured to encode, on a MAC layer, N data units, each comprising payload data, into M parity units, each comprising parity data allowing the reconstruction of one or more erroneous data units among said N data units in a receiver apparatus, according to a parity rule, the N data units and the corresponding M parity units representing a parity block, and to form a MAC layer data stream from the data units and the parity units of the parity block. The PHY layer processing circuitry is configured to encode, on a PHY layer, bits of the MAC layer data stream into codewords of a code and to form a PHY layer data stream from the codewords.

19 Claims, 11 Drawing Sheets

(58) Field of Classification Search
CPC .............. H04L 27/26; H04W 72/0466; H04W 72/0446; H04W 4/08
USPC ......................................................... 370/335
See application file for complete search history.

(56) References Cited

U.S. PATENT DOCUMENTS

| | | | | |
|---|---|---|---|---|
| 10,355,715 | B2* | 7/2019 | Petrov | H03M 13/6508 |
| 2006/0095611 | A1* | 5/2006 | Winchester | G06F 13/28 |
| | | | | 710/52 |
| 2006/0123321 | A1* | 6/2006 | Deenadhayalan | G06F 11/1088 |
| | | | | 714/763 |
| 2007/0094580 | A1* | 4/2007 | Livshitz | H04L 1/0057 |
| | | | | 714/779 |
| 2007/0177734 | A1 | 8/2007 | Walker et al. | |
| 2007/0180349 | A1* | 8/2007 | Jacobsen | H04L 1/0007 |
| | | | | 714/776 |
| 2008/0155372 | A1* | 6/2008 | Kravitz | H04L 1/0061 |
| | | | | 714/752 |
| 2008/0304483 | A1* | 12/2008 | Williams | H04L 69/22 |
| | | | | 370/389 |
| 2009/0086699 | A1* | 4/2009 | Niu | H04L 1/007 |
| | | | | 370/342 |
| 2009/0313520 | A1* | 12/2009 | Chung | H03M 13/6393 |
| | | | | 714/751 |
| 2009/0327747 | A1* | 12/2009 | Bruekers | G07C 9/257 |
| | | | | 713/189 |
| 2010/0115359 | A1* | 5/2010 | Chung | H03M 13/1102 |
| | | | | 714/E11.131 |
| 2010/0199144 | A1* | 8/2010 | Li | H04L 1/0045 |
| | | | | 714/752 |
| 2010/0260266 | A1 | 10/2010 | Gholmieh et al. | |
| 2011/0153939 | A1* | 6/2011 | Choi | G11C 11/401 |
| | | | | 711/E12.002 |
| 2012/0099670 | A1* | 4/2012 | Gunnam | H04L 1/0067 |
| | | | | 375/295 |
| 2013/0097470 | A1* | 4/2013 | Hwang | H03M 13/35 |
| | | | | 714/E11.032 |
| 2013/0227376 | A1* | 8/2013 | Hwang | H04L 1/0083 |
| | | | | 714/776 |
| 2014/0233483 | A1 | 8/2014 | You | |
| 2015/0249835 | A1* | 9/2015 | Yie | H04N 19/895 |
| | | | | 375/240.02 |
| 2015/0331741 | A1* | 11/2015 | Park | H03M 13/152 |
| | | | | 714/768 |
| 2016/0056905 | A1* | 2/2016 | Hartlmueller | H04J 3/0697 |
| | | | | 375/354 |
| 2016/0134392 | A1* | 5/2016 | Effenberger | H04L 1/0057 |
| | | | | 714/776 |
| 2016/0198317 | A1* | 7/2016 | Li | H04W 4/08 |
| | | | | 370/312 |
| 2017/0005674 | A1* | 1/2017 | Hussain | H04L 1/0045 |
| 2017/0033806 | A1* | 2/2017 | Arslan | G06F 3/0616 |
| 2017/0255517 | A1* | 9/2017 | Achtenberg | G06F 3/064 |
| 2017/0308299 | A1* | 10/2017 | Cha | H03M 13/1575 |
| 2018/0013451 | A1* | 1/2018 | Kaynak | G11C 29/52 |
| 2018/0019840 | A1* | 1/2018 | Lomayev | H04L 1/0057 |
| 2018/0076992 | A1* | 3/2018 | Nabetani | H04L 1/1845 |
| 2018/0152205 | A1* | 5/2018 | Kim | H04L 1/0071 |
| 2019/0114224 | A1* | 4/2019 | Motwani | G11C 29/52 |
| 2019/0140784 | A1* | 5/2019 | Xi | H03M 13/2942 |
| 2019/0268092 | A1* | 8/2019 | Byun | H04L 1/0057 |
| 2019/0334558 | A1* | 10/2019 | Razzetti | H04L 1/0057 |
| 2019/0356589 | A1* | 11/2019 | Louzoun | H04L 49/9042 |
| 2019/0391870 | A1* | 12/2019 | Varanasi | G11C 29/52 |
| 2020/0007275 | A1* | 1/2020 | Sarkis | H04L 1/0082 |
| 2020/0036477 | A1* | 1/2020 | Xu | G06F 9/30029 |
| 2020/0042386 | A1* | 2/2020 | Pruett | G06F 3/0652 |
| 2021/0152284 | A1* | 5/2021 | Handte | H04L 1/0057 |

OTHER PUBLICATIONS

Oliver Hoffmann et al: "Efficiency of frame aggregation in wireless multimedia networks based on IEEE 802.11n", Consumer Electronics (ISCE), 2010 IEEE 14th International Symposium on, IEEE, Piscataway, NJ, USA, Jun. 7, 2010(Jun. 7, 2010), pp. 1-5.
International Search Report and Written Opinion mailed on Oct. 14, 2019, received for PCT Application PCT/EP2019/070820, Filed on Aug. 1, 2019, 10 pages.
IEEE Computer Society, "Part 11: Wireless LAN Medium Access Control (MAC) and Physical Layer (PHY) Specifications", IEEE Standard Association, Dec. 28, 2012, pp. 1-598.
IEEE Computer Society, "Part 11: Wireless LAN Medium Access Control (MAC) and Physical Layer (PHY) Specifications", IEEE Standard Association, Dec. 7, 2016, pp. 1-3532.
IEEE Computer Society, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE P802.11ay/D2.0, Jul. 2018, pp. 1-673.
Chari et al., "FLO physical layer: An overview", IEEE Transactions on Broadcasting, vol. 53, No. 1, Mar. 2007, pp. 145-160.
Van Der Schaar et al, "Adaptive Cross-Layer Protection Strategies for Robust Scalable Video Transmission over 802.11 WLANs", IEEE Journal on Selected Areas in Communications, vol. 21, No. 10, Dec. 2003, pp. 1752-1763.
Choi et al., "IEEE 802.11 MAC-Level FEC Scheme with Retransmission Combining", IEEE Transactions on Wireless Communications, vol. 5, No. 1, Jan. 2006, pp. 203-211.
Tsai et al., "MAC-Level Forward Error Correction Mechanism for Minimum Error Recovery Overhead and Retransmission", Mathematical and Computer Modelling, vol. 53, Issues 11-12, Jun. 2011, pp. 2067-2077.
Li et al., "Providing Adaptive QoS to Layered Video Over Wireless Local Area Networks Through Real-Time Retry Limit Adaptation", IEEE Transactions on Multimedia, vol. 6, No. 2, Apr. 2004, pp. 278-290.
ETSI, "Digital Video Broadcasting (DVB); Upper Layer FEC for DVB Systems", TR 102 993 V1.1.1, Feb. 2011, pp. 1-89.
Digital Video Broadcasting, "Upper Layer Forward Error Correction in DVB", DVB Document A148, Mar. 2010, pp. 1-98.
Xiaofeng Xu et al: "Fine-granular-scalability video Streaming over wireless lans using cross layer error control", Acoustics, Speech, and Signal Processing, 2004. Proceedings. (ICASSP '04). IEEE International Conference on Montreal, Quebec, Canada May 17-21, 2004, pp. 989-992, vol. 5, Piscataway, NJ, USA, IEEE, Piscataway, NJ USA, XP010719097.

* cited by examiner

TRANSMISSION APPARATUS AND METHOD, RECEIVING APPARATUS AND METHOD FOR LATENCY REDUCTION USING FEC PACKETS AT MAC LAYER

CROSS-REFERENCE TO RELATED APPLICATIONS

The present application is based on PCT filing PCT/EP2019/070820, filed Aug. 1, 2019, which claims priority to EP 18187250.8, filed on Aug. 3, 2018, the entire contents of each are incorporated herein by reference.

BACKGROUND

Field of the Disclosure

The present disclosure relates to a transmission apparatus and a corresponding method as well as a receiving apparatus and method for use in a communication system, e.g. in a wireless communication system.

Description of Related Art

There is an increasing need for communication systems and elements thereof for transmission and reception providing at the same time low latency, high reliability, and extremely low bit or packet error rates. Application examples comprise but are not limited to industry 4.0 applications, robotics, virtual reality (VR), or tactile internet.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a transmission apparatus and a receiving apparatus as well as corresponding methods enabling an improvement in respect of latency, reliability and/or bit error rate in communication systems.

It is a further object to provide corresponding methods as well as a corresponding computer program and a non-transitory computer-readable recording medium for implementing said methods.

According to an aspect there is provided a transmission apparatus comprising:
MAC layer processing circuitry configured to encode, on a MAC layer, N data units, each comprising payload data, into M parity units, each comprising parity data allowing the reconstruction of one or more erroneous data units among said N data units in a receiver apparatus, according to a parity rule, the N data units and the corresponding M parity units representing a parity block, and to form a MAC layer data stream from the data units and the parity units of the parity block, and
PHY layer processing circuitry configured to encode, on a PHY layer, bits of the MAC layer data stream into codewords of a code and to form a PHY layer data stream from the codewords.

According to a further aspect there is provided a receiving apparatus comprising:
PHY layer processing circuitry configured to derive codewords of a code from a received PHY layer data stream and to decode, on a PHY layer, the codewords into bits of a MAC layer data stream, and
MAC layer processing circuitry configured to derive from the MAC layer data stream N data units, each comprising payload data, and corresponding M parity units, each comprising parity data, the N data units and the M parity units forming a parity block, to detect erasures in the N data units, and to reconstruct, on a MAC layer, according to a parity rule one or more data units by use of the parity units if an erasure has been detected in one or more data units.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed transmission method, the disclosed receiving method, the disclosed computer program and the disclosed computer-readable recording medium have similar and/or identical further embodiments as the claimed apparatuses and as defined in the dependent claims and/or disclosed herein.

According to the present disclosure a coding scheme on lower MAC layer is used to protect data units which are exchanged between two communication devices. An originator communication device inserts parity data units into the transmission stream which enables the recipient communication device to reconstruct erroneously received data units. In contrast to known systems, where the recipient solicits a retransmission of erroneously received data units, the proposed scheme achieves both a significantly lower latency and lower residual error rate. Furthermore, implementation of the proposed coding scheme within a communication system in accordance with one of the WiFi standards is addressed.

Hence, one of the ideas of the disclosure is to generate one or more parity units at the transmitter according to a parity rule and insert them in an appropriate way to the stream of data units. In addition to conventional PHY layer encoding, encoding in the MAC layer is added. In contrast to PHY layer encoding, where encoding is performed on bit level, this MAC layer encoding processes entire data units, i.e. more than one bit and typically more than one octet (byte). This MAC layer encoding enables the receiver to detect and reconstruct erasures, i.e., non-detectable or erroneously received data units with known location, whereas conventional PHY layer encoding only enables the receiver to detect and correct erroneously received bits.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

This disclosure is directed to packet based data transmission, where an originator station (STA; also referred to as transmission apparatus herein) communicates with a recipient STA (also referred to as receiving apparatus herein). The originator STA is assumed to send one or more data units to the recipient STA, which conventionally provides feedback of the status of reception, e.g. acknowledgement or block acknowledgement, i.e. an acknowledgement of a series of data units. If data units are erroneously received, the originator STA may repeat those data units. A data unit is defined to be one or more or a fragment of data frame(s) to be transmitted. Data units, control or management frames may be aggregated. Control or management frames are used to control or configure the peer STA(s).

Such a data transmission has the following characteristics: Latency is defined by the time between first transmission of a data unit until successful reception of this data unit (Residual) packet error rate (PER) is defined by the ratio of the number of erroneous received data units and all data units after potential retransmission(s). In good approximation, the residual PER P is given by $$P \sim \left(\frac{P_0}{Q \cdot R}\right)^{S+1}$$

with $P_0$ being the PHY frame error rate of an data unit of size $L_0$ at a signal to noise ratio (SNR) of $\gamma_0$. The parameter Q is a weighting factor, accounting for varying data unit payload size $L_0/Q$, the parameter R considers varying SNR $\gamma_0 + \Delta\gamma \cdot \log_2 R$, and the parameter S is number of retransmissions. The constant $\Delta\gamma$ is a property of the PHY layer encoding and is roughly 0.17 dB for WLAN in AWGN channel. It may be observed that retransmissions S are very powerful compared to parameter Q to achieve lower residual PER as S affects the exponent. However, S>0 increases latency, Q>1 lowers PHY layer efficiency, and R>1 requires more link budget resulting in, e.g., lower coverage. The formula above holds for $P_0 \ll 1$ and assumes that PHY layer coding operates in waterfall region and has no error floor. It is an objective of the system designer to find a good trade-off between Q, S, R and the boundary conditions to achieve the desired residual PER P.

Figure 1:
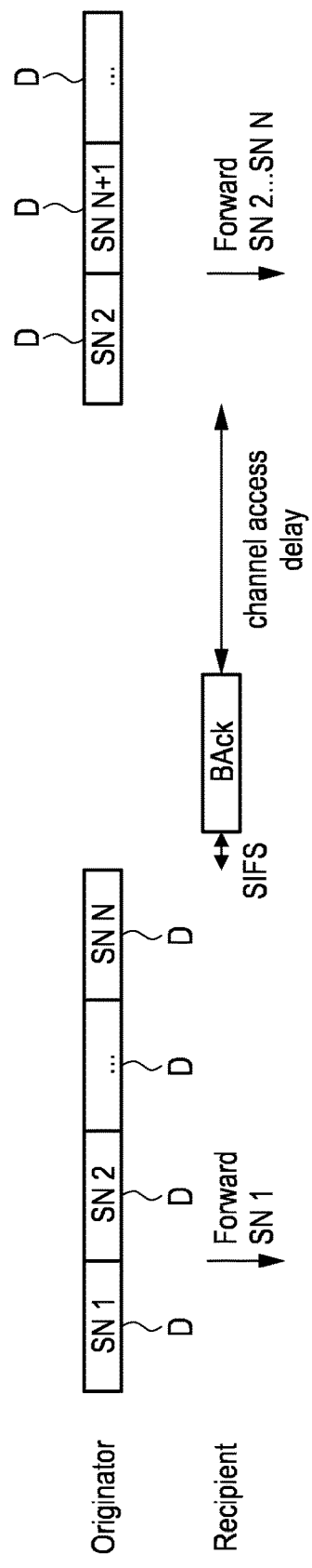
FIG. 1 shows a schematic diagram of the conventional data flow enabling the correction of errors.

Referring now to the drawings, wherein like reference numerals designate identical or corresponding parts throughout the several views, FIG. 1 shows a schematic diagram of the conventional data flow enabling the correction of errors. This data flow uses retransmission: The originator sends several data units D in an aggregate, i.e., a series of data units D. Each data unit D has a sequence number (SN). After the $N^{th}$ data unit, the recipient sends a block acknowledgement (BAck) to the originator indicating a status of reception of data units with SN 1 to SN N. It is exemplarily assumed that data unit with SN 2 was erroneously received. Thus, it is repeated by the originator at the next opportunity, which may be significantly later in time, which causes a major part of the undesired latency. The recipient forwards each successfully received data unit to higher layer but only if the SN is continuous. Thus, SN 3 up to SN N are kept in a buffer and released as soon as SN 2 is successfully received and forwarded. Consequently, a received data unit that is erroneous may cause latency not only to itself but also to one or more data units following the erroneous data unit.

The aim of the present disclosure is to reduce or completely avoid the need for explicitly requested retransmissions. This is achieved by transmission of redundancy or parity units which may be used by the recipient to reconstruct erroneously received data units (erasures). In short, the originator provides parity units which provide an erasure coding on data unit level and inserts the parity units in a data transmission stream, and the recipient may evaluate the parity units to reconstruct erasures in the data transmission stream. Optionally, the originator and the recipient may negotiate a redundancy rule according to which the erasure coding is performed, and a selection of coding rules to generate parity units may be available.

Figure 2:
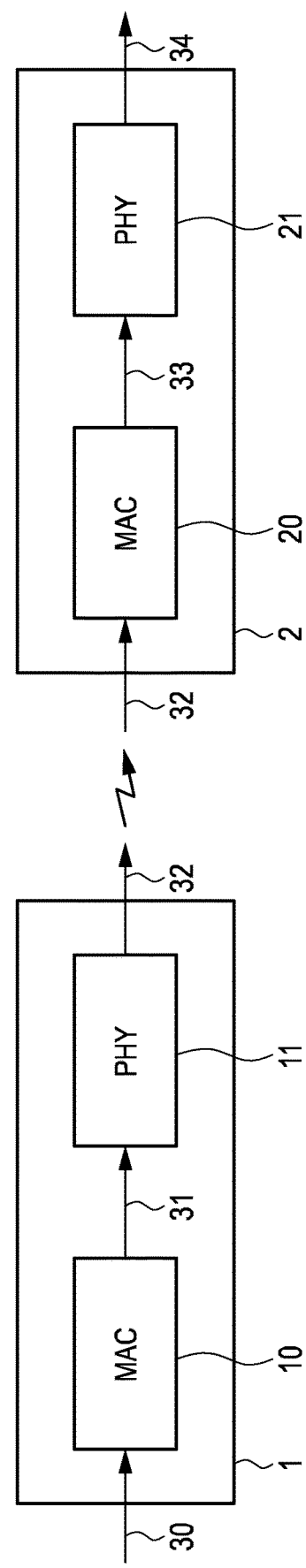
FIG. 2 shows a schematic diagram of an embodiment of a transmission apparatus and a receiving apparatus according to the present disclosure.

FIG. 2 shows a schematic diagram of an embodiment of a transmission apparatus 1 and a receiving apparatus 2 according to the present disclosure.

The transmission apparatus 1 receives input data 30 to be transmitted and comprises MAC layer processing circuitry 10 and PHY layer processing circuitry 11. The MAC layer processing circuitry 10 is configured to encode, on a MAC layer, N data units, each comprising payload data, into M parity units, each comprising parity data allowing the reconstruction of one or more erroneous data units among said N data units in a receiver apparatus, according to a parity rule, the N data units and the corresponding M parity units representing a parity block, and to form a MAC layer data stream 31 from the data units and the parity units of the parity block. The PHY layer processing circuitry 11 is configured to encode, on a PHY layer, bits of the MAC layer data stream 31 into codewords of a code and to form a PHY layer data stream 32 from the codewords.

The receiving apparatus 2 comprises PHY layer processing circuitry 20 and MAC layer processing circuitry 21. The PHY layer processing circuitry 20 is configured to derive codewords of a code from a received PHY layer data stream 32 and to decode, on a PHY layer, the codewords into bits of a MAC layer data stream 33. The MAC layer processing circuitry 21 is configured to derive from the MAC layer data stream 33 N data units, each comprising payload data, and corresponding M parity units, each comprising parity data, the N data units and the M parity units forming a parity block, to detect erasures in the N data units, and to reconstruct, on a MAC layer, according to a parity rule one or more data units by use of the parity units if an erasure has been detected in one or more data units. The output of the receiving apparatus are output data 34 including the decoded and, if needed, reconstructed data units.

Figure 3:
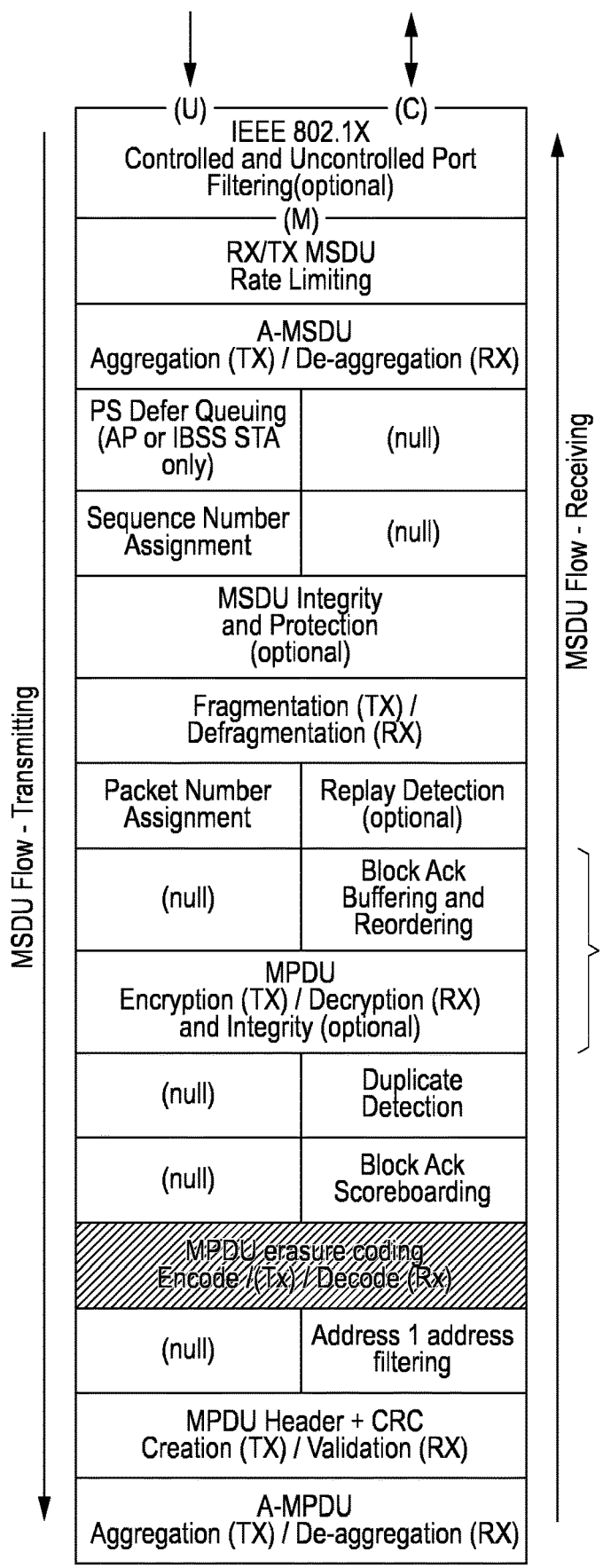
FIG. 3 shows a schematic diagram illustrating the location of the proposed encoding on the MAC layer.

In more detail, it is one of the ideas to generate one or more parity units at the transmitter according to a parity rule (sometimes also called redundancy rule) and to insert them in an appropriate way to the stream of data units. The proposed encoding resides in the lower MAC layer below the upper PHY layer, as shown in FIG. 3 depicting a schematic diagram illustrating the location of the proposed encoding on the MAC layer. In contrast to PHY layer encoding, where encoding is performed on bit level, this encoding processes entire data units, i.e. more than 1 bit and typically more than 1 octet (byte). Further, the encoding is done such that the receiver may reconstruct erasures, i.e., non-detectable or erroneously received data units with known location, whereas PHY layer encoding is done such that the receiver may detect and correct erroneously received bits. For reconstructing a certain amount of erasures (i.e. one or more erased data units) in a parity block of the MAC layer by use of the one or more parity units of said parity block.

Figure 4:
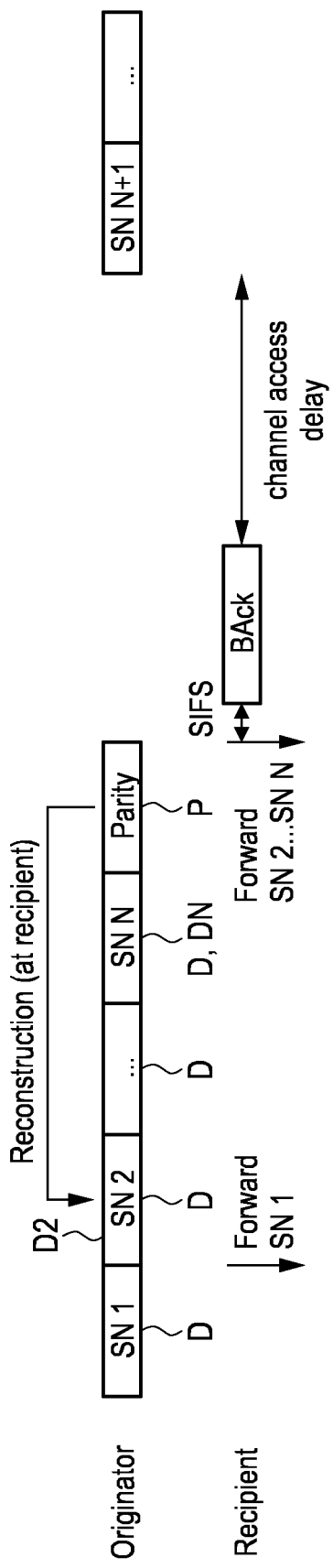
FIG. 4 shows a schematic diagram of an exemplary data flow according to the present disclosure enabling the correction of erasures.

FIG. 4 shows a schematic diagram of an exemplary data flow according to the present disclosure enabling the correction of erasures. In this example N data units D (with SN1, SN 2, . . . , SN N) are followed by M (=1 in this example) parity unit P. In contrast to the data flow shown in FIG. 1, the recipient may use the parity unit P—given its successful reception—to reconstruct the data unit D2 erased in error, i.e., the data unit with SN 2. In comparison to the data flow shown in FIG. 1, latency defined by the point in time when the data unit DN with SN N is forwarded, is significantly reduced.

The major part of latency gain is defined by the channel access delay, which may become large in dense networks or in scenarios where BAcks are only rarely send. Such scenarios comprise MU-MIMO in which recipient specific data units are transmitted in a multiuser mode from a single originator to multiple recipients; typically, only a few BAcks may be multiplexed when transmitted in the opposite direction, i.e. from recipients to originator.

Broadcast in which same data units are transmitted by the originator to a multitude of recipients.

Multicast in which groups of data units are transmitted by the originator to a multitude of groups of recipients.

In all three cases, the BAck is solicited successively from each or a small group of recipient(s) by the originator which is time consuming, makes the channel access delay long, and thus increases the latency gain of the proposed scheme.

In an embodiment each data unit comprises a header, payload and a frame check sequence (FCS). The header may comprise information about type of data unit (identification, frame control), and/or transmitter and receiver address, and/or duration, and/or other information such as sequence number (SN) for pure data frames for example. The payload holds user data unit, and/or management, and/or control data. The payload may be encrypted user data unit (MSDU). The FCS is a (e.g. CRC) checksum over the entire data unit except the FCS itself. The header defines the interpretation and content of the payload, whereas the FCS is used to validate the received data unit. The recipient evaluates the FCS to determine if a data unit is erroneously received and is an erasure.

In an embodiment a parity unit is a data unit where the header may comprise at least the following information: Frame identification identifying the frame to be a parity data unit frame, and/or duration indicating the length of the aggregate data unit, and/or recipient and transmitter MAC address, and/or parity information indicating the applied parity rule and/or parity block length N+M (this information may be discarded if previous negotiation between originator and responder resulted in an agreed parity rule), and/or parity sequence information indicating the index of the parity data unit which is contained in the payload of this parity data unit (this information is obsolete, if the parity information indicates that the parity rule features a single parity unit only). The payload of a parity data unit comprises the actual parity data which has been computed by the encoder based on one or more preceding data units (preceding before interleaving of parity units and data units). Like any other data unit, the parity unit may comprise a FCS after the payload. The recipient evaluates the FCS to determine if a parity unit is erroneously received and is an erasure. In case of an erasure, this parity unit shall not be used for reconstruction of any data unit.

Figure 5:
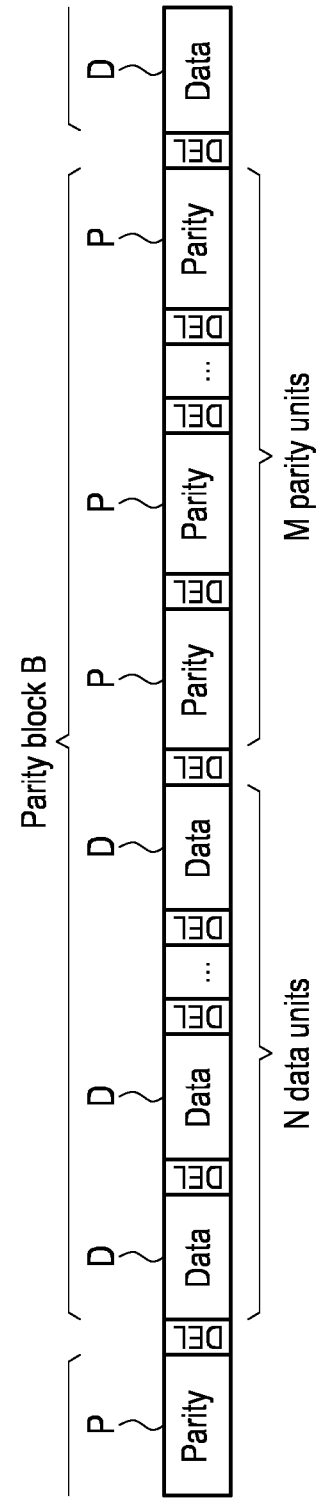
FIG. 5 shows a schematic diagram of a parity block as used by the conventional data flow enabling the correction of erasures.

In an aggregation of data units (e.g. A-MPDU) each data unit (e.g. MPDU) is separated from each other by a delimiter DEL. FIG. 5 shows an excerpt of an exemplary aggregation of N data units followed by M parity units. N data units D and M parity units P form a parity block B. Each parity block B is assumed to be independently decodable, i.e., parity blocks are independent from each other. Preferably, each data unit and parity unit may comprise a sequence number for the receiver to reassemble data in correct (e.g. ascending) order.

For the envisioned parity operation, it is useful to provide additional information in the delimiter, in particular an indication that a new parity block starts with the following data unit and/or an indication that the following unit is a parity unit and/or information regarding the following parity unit e.g., length. Those indication(s) are preferably implemented by using reserved bits of the delimiter sequence. As an alternative, a new delimiter may be defined which is placed before the legacy delimiter. The new delimiter may be designed such that legacy devices assume the new delimiter to be corrupt, e.g., by changing the delimiter signature. Thus, it will be ignored by legacy devices which will scan further to identify the legacy delimiter.

Figure 6:
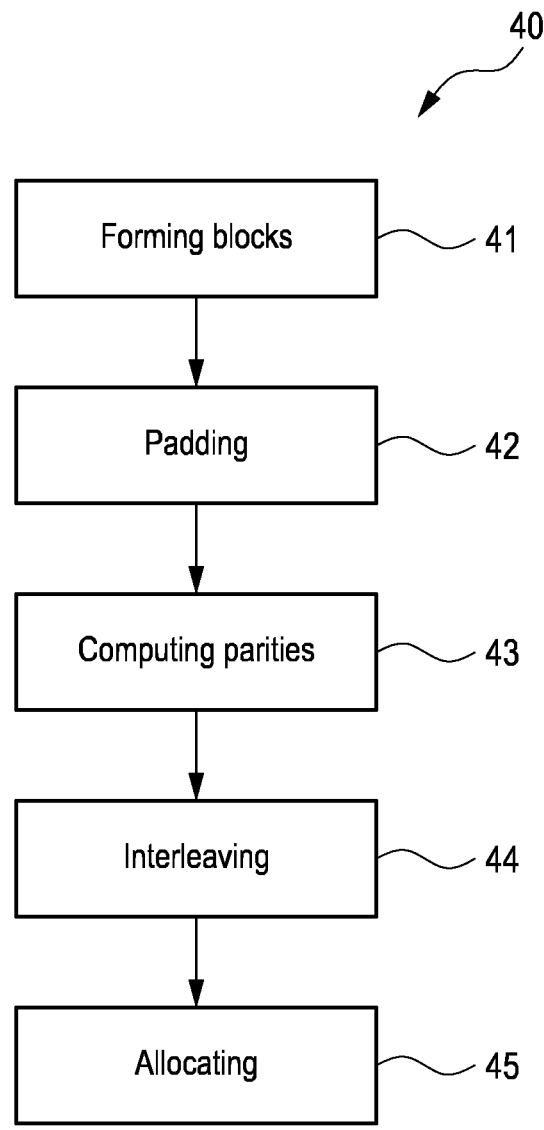
FIG. 6 shows a flow chart illustrating an embodiment of the MAC layer encoding according to the present disclosure.

FIG. 6 shows a flow chart 40 illustrating an embodiment of the MAC layer encoding of the parity unit. This MAC layer encoding is performed by the MAC layer processing circuitry 10 and comprises the following steps.

In a first step 41 the originator forms blocks of N data units $x_i$, with $0 \leq i < N$. In a second step 42 the originator pads all N data units to same length. It first determines the longest data unit (including header, payload and FCS) by $L = \max_i \{length(x_i)\}$ and creates $y_i$ by appending to each $x_i$, a known padding sequence of length $L - length(x_i)$. The padding sequence may be all zeros or all ones sequence for simple implementation. The padded sequence $y_i$ may be used for parity computation only and is not transmitted.

In a third step 43 the originator computes for each block of N padded data units $y_i$ the parity units $p_j$ with $0 \leq j < M$ according to a predetermined parity rule. The predetermined parity rule defines N and M as well as the function P which generates $p_j = P(x_0, \ldots, x_{N-1})$. Each parity unit $p_j$ has payload length L.

In a fourth step 44 the originator interleaves data $x_i$, and parity data units $p_j$ in an appropriate way. The interleaver behavior is either predetermined or obvious for the receiver, i.e., by using the modified delimiters illustrated in FIG. 5. As a simple variant, data units and parity units may be concatenated as shown in FIG. 5. Further, in an embodiment the data units and the parity units are just forwarded to the PHY layer without internal interleaving or reordering.

Figure 7:
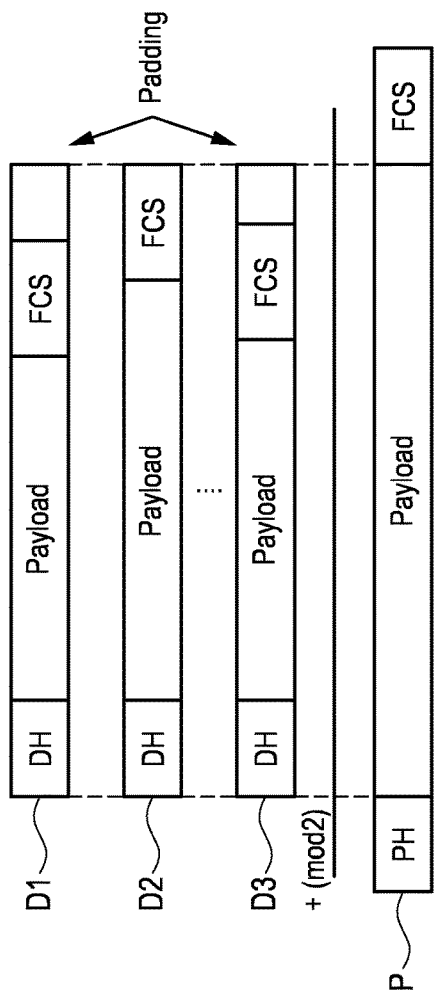
FIG. 7 shows a schematic diagram illustrating an embodiment for the generation of a parity unit according to an embodiment of the present disclosure.

In an optional fifth step 45 the transmitter allocates the interleaved data and parity data units to PHY layer resources. Different PHY layer resources may be obtained by time, frequency, code, and/or spatial diversity. Each resource may have different configuration in terms of modulation and coding mechanisms and related properties in terms of throughput and error rate. An allocation unit which is aware of those properties may control the assignment of data units and parity data units to PHY layer resources to achieve predefined targets such as residual error rate, throughput, and latency. PHY layer resources may also be different frequencies and/or spatial streams generated by beam-forming and/or spatial separation and/or polarization multiplex FIG. 7 shows a schematic diagram illustrating an embodiment for the generation of a parity data unit according to an embodiment of the present disclosure. This diagram visualizes steps 41 to 43 of the method shown in FIG. 6. In this embodiment three (i.e., N=3) data units D1, D2, D3 are used to form one block of data units. Each data unit comprises a header DH, a payload portion and a frame check sequence FCS. The first and third data units D1 and D3 are padded to have the same length as the second data unit D2, before the parity unit P is computed. The parity unit P comprises a header PH, a payload portion and a frame check sequence FCS.

Figure 8:
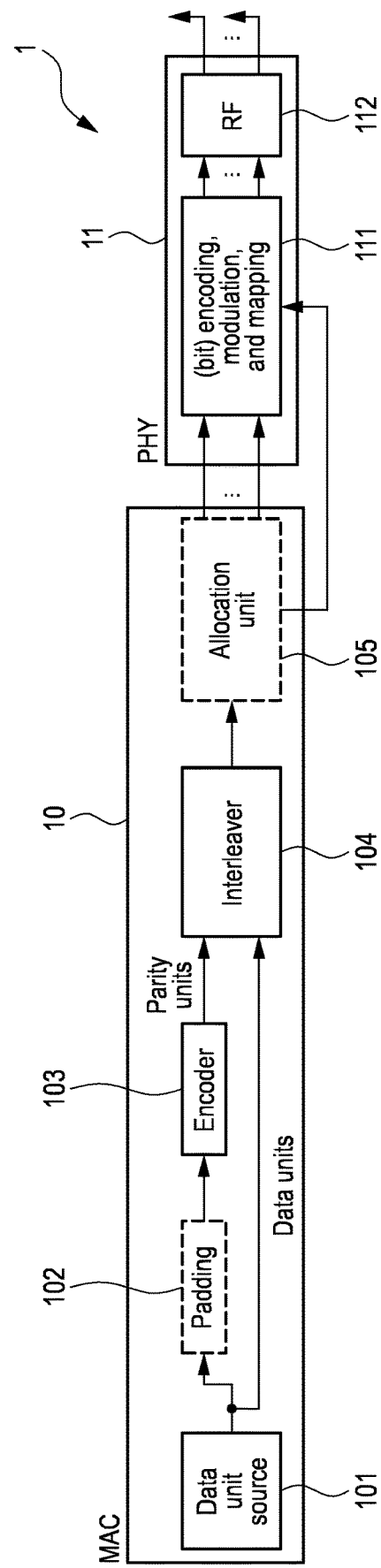
FIG. 8 shows a schematic diagram of a more detailed embodiment of a transmission apparatus according to the present disclosure.

FIG. 8 shows a schematic diagram of a more detailed embodiment of a transmission apparatus 1 according to the present disclosure. The MAC layer processing circuitry 10 comprises a data unit source 101, e.g. a storage unit or a data interface for receiving data, a padding circuit 102 for padding the data units as described above, a MAC layer encoder 103 for encoding the padded data units to obtain the parity units as described above, an optional interleaver 104 for interleaving the data units and the parity units of a parity block and an optional allocation circuit 105 for allocating the interleaved data units and parity units to resources of the PHY layer processing circuitry 11, in particular of the encoding, modulation and mapping circuit 111.

The PHY layer processing circuitry 11 comprises a PHY layer encoding (e.g. for LDPC encoding), mapping (e.g. for QPSK mapping), and modulation (e.g. for OFDM modulation) circuit 111 and a transmission circuit 112. The PHY layer input data are the bits to be transmitted, i.e., concatenated data and parity data units including delimiters. It should be well noted that the PHY layer is not aware of the MAC layer data unit structure and observes a bit stream at its input. The PHY layer encoding, mapping and modulation circuit 111 performs encoding (e.g. LDPC) corresponding to its configuration on codeword basis, i.e., a portion of the input bit stream corresponding to information data length of the channel code is encoded into parity bits. Both the portion of the input bit stream (information bits) and associated parity bits are further processed by mapping and modulation. This block-wise encoding is continued until all bits of the input bit stream are processed. If appropriate, padding is done to fill-up the information bits of the last codeword. The resulting output bit stream is provided to a modulation and an RF circuit for transmitting it to a receiving apparatus.

Since the bit encoding on PHY layer is independent of and non-synchronized to MAC layer data units, codeword errors on the PHY layer may result in one or more data unit erasures on the MAC layer. The proposed MAC layer encoding helps to recover or alleviate the impact of such erasure patterns.

Figure 9:
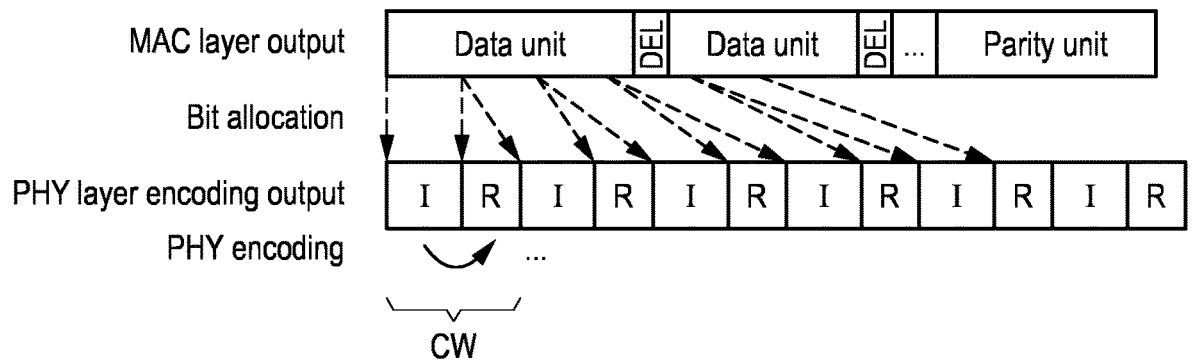
FIG. 9 shows a schematic diagram illustrating an embodiment of the allocation of the data units and parity units onto PHY layer codewords.

FIG. 9 shows a schematic diagram illustrating an embodiment of the allocation of the MAC layer data stream, i.e., the output of the interleaver 104 shown in FIG. 8, including data units D and parity units P onto PHY layer codewords CW. The structure of the MAC layer data stream is generally known only to the MAC layer processing circuitry 10 and the codeword structure is generally known only to the PHY layer processing circuitry 11, i.e. these structures are mutually independent. A systematic code is used in an embodiment, and a codeword CW holds information data I and parity/redundancy data R of PHY encoding.

Figure 10:
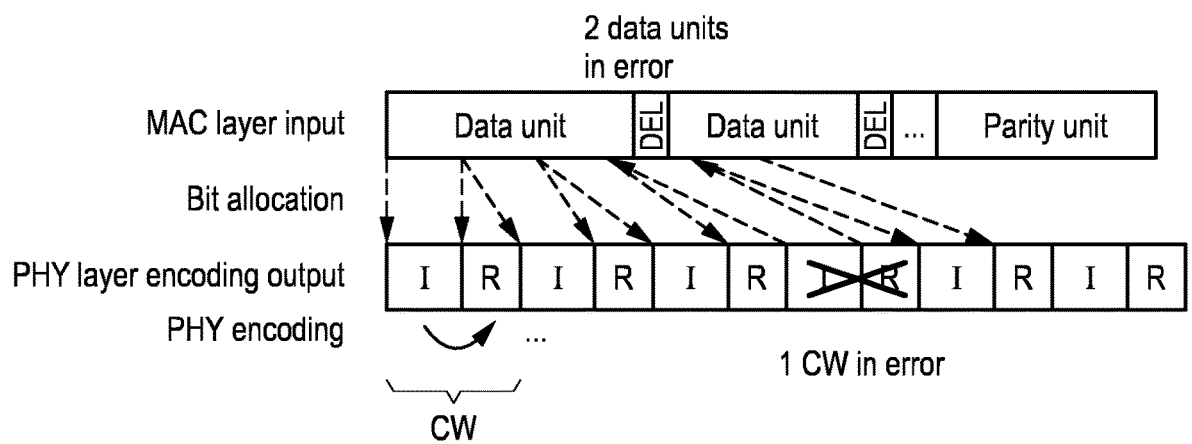
FIG. 10 shows a schematic diagram illustrating the error behavior of the allocation scheme illustrated in FIG. 9.

FIG. 10 shows a schematic diagram illustrating the error behavior of the allocation scheme illustrated in FIG. 9. The given example shows that a single codeword CW in error may result in two erased data units (including delimiter) at the recipient MAC layer input. Generally, PHY layer errors affect at least one codeword.

According to the WLAN standard IEEE 802.11ad, for example, the LPDC codeword length is 672 bits, resulting in an information data length of 42 or 73 octets (code rate dependent). The MAC overhead to form a data unit is about 28 octets and typical data payload is between 1024 and 8192 octets. Thus, a single data unit is transmitted in roughly 10 to 160 LDPC codewords.

Figure 11:
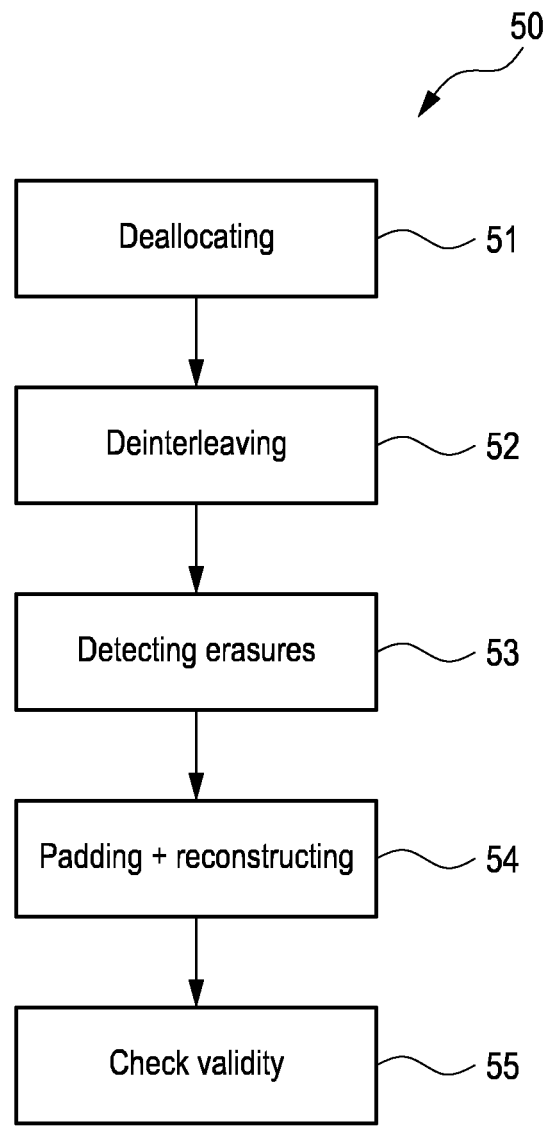
FIG. 11 shows a flow chart illustrating an embodiment of the MAC layer decoding according to the present disclosure.

FIG. 11 shows a flow chart 50 illustrating an embodiment of tie MAC layer decoding of the parity unit. This MAC layer decoding is performed by the MAC layer processing circuitry 21 and comprises the following steps.

In a first optional step 51 the recipient performs deallocation. In a second step 52 the recipient performs deinterleaving of the data units, i.e. dividing the stream of data units in data units $\hat{x}_i$ and parity units $\hat{p}_j$. This may be either performed according to predetermined interleaving configuration or by evaluating the delimiter information in the received data unit stream.

In a third step 53 an erasure detector at the recipient evaluates if any of the N data units is erroneous. This may be done by evaluation of the FCS. If all data units are valid, the data units are forwarded to a higher layer and the related parity units are discarded. If at least one data unit is erroneous the decoder tries to recover this data unit based on the parity units. A parity unit shall not be used for reconstruction of data units if the parity unit is erroneous, i.e. the FCS of a parity unit shall be valid.

In a fourth step 54 the decoder determines L by evaluating the payload length (signaled e.g. in the delimiter) of the parity unit(s) and pads the correctly received data units according to the predetermined padding sequence. The correctly received padded data units $\hat{y}_l$ together with the correctly received parity units $\hat{p}_j$ are used to reconstruct erroneous data units. After reconstruction, the data units are limited to their original size by removing the padding sequence. Optionally, the reconstruction is considered to have failed if the discarded padding sequence does not correspond to the known padding sequence.

In a fifth step 55 the FCS of the reconstructed data unit is evaluated. If the reconstruction was successful, i.e. if the FCS is valid, the payload of the reconstructed data unit is forwarded to a higher layer and marked to be successfully received in the recipient's BAck scoreboard. If the reconstruction was not successful, the data unit is marked to be non-successfully received in the recipient's BAck scoreboard and is e.g. pending for retransmission.

Figure 12:
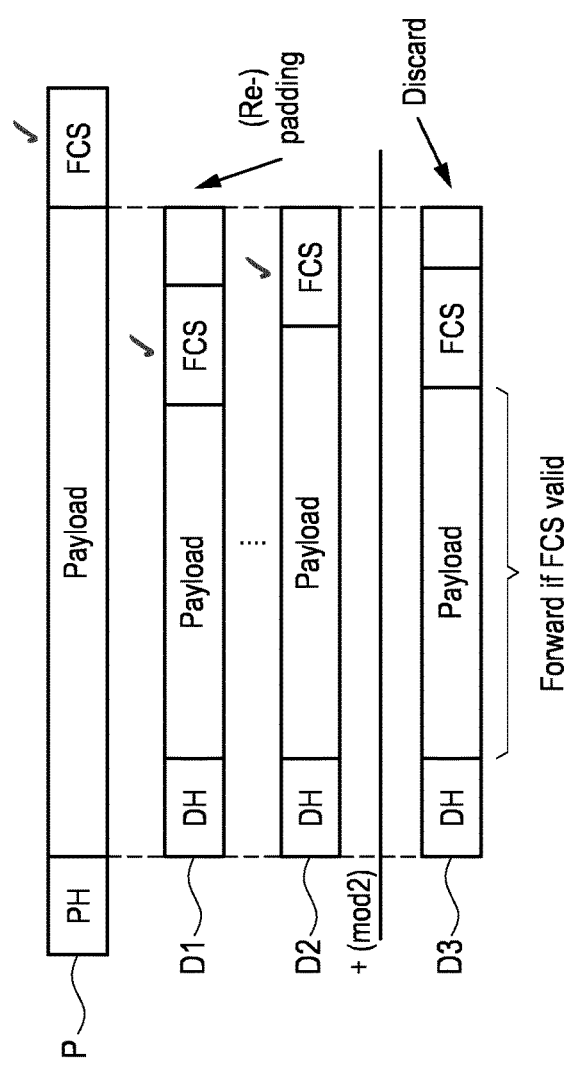
FIG. 12 shows a schematic diagram illustrating the reconstruction of an erroneous data unit according to an embodiment of the present disclosure.

FIG. 12 shows a schematic diagram illustrating the reconstruction of an erroneous data unit according to an embodiment of the present disclosure. This diagram visualizes steps 53 to 55 of the method shown in FIG. 11. In this embodiment one valid parity unit P and two valid data units D1 and D2 are used to reconstruct on erroneous data unit D3. The first data unit D1 is padded to have the same length as the second data unit D2 before the third data unit D3 is reconstructed.

Figure 13:
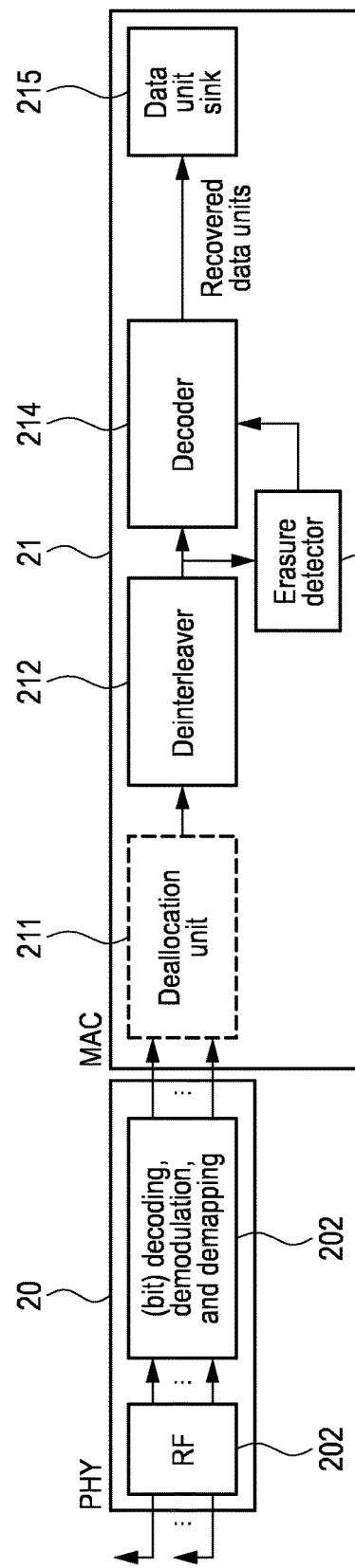
FIG. 13 shows a schematic diagram of a more detailed embodiment of a receiving apparatus according to the present disclosure.

FIG. 13 shows a schematic diagram of a more detailed embodiment of a receiving apparatus 2 according to the present disclosure. The PHY layer processing circuitry 20 is configured to perform the inverse processing of the processing performed by the PHY layer processing circuitry 11 of the transmission apparatus 1. It comprises a reception circuit 201 and a PHY layer decoding (e.g. for LDPC decoding), demodulation (e.g. for OFDM demodulation) and demapping (e.g. for QPSK demapping) circuit 202.

The MAC layer processing circuitry 21 is configured to perform the inverse processing of the processing performed by the MAC layer processing circuitry 10 of the transmission apparatus 1. It comprises an optional deallocation circuit 211, an optional deinterleaver 212, an erasure detector 213, a decoder 214 and a data unit sink 215, e.g. a storage unit or a data interface for outputting data.

Before parity unit encoding is performed by the MAC layer processing circuitry 10, predetermined parameters shall be known to originator and recipient. This may either be done as part of the BAck agreement (i.e. negotiation) between originator and recipient or by evaluating parity capability information of the recipient.

An originator may have different redundancy rules with same recipient depending on different traffic categories or priorities. A differentiation can be done by a traffic identifier (TID). Moreover, if an originator (e.g. AP) serves several recipients (e.g. STAs), redundancy rules may be different from each other. In other words, the redundancy rules may be a function of originator address, recipient address, and/or TID. This may include different redundancy rules for Downlink (e.g. AP->STA) and Uplink (e.g. STA->AP).

For the first case, the BAck agreement is extended by parity operation parameters and is performed before the start of a BAck session. The originator solicits a BAck agreement with the recipient by ADDBA (additional back acknowledgement) request and response message exchange. As part of this BAck agreement, parity unit encoding parameters are negotiated and include the redundancy rule (function P), the interleaver configuration, N and M and the allocation rule. The originator proposes those parameters in the ADDBA request, whereas the parameters sent in the ADDBA response by the recipient are binding.

In the second case, the originator checks the capabilities of the recipient. The capabilities of a STA are advertised before or while the association process. The originator shall not perform any parity unit encoding which is not supported by the recipient. The actual parity rule, which the originator applies, is disclosed in the header of a parity unit.

Figure 17:
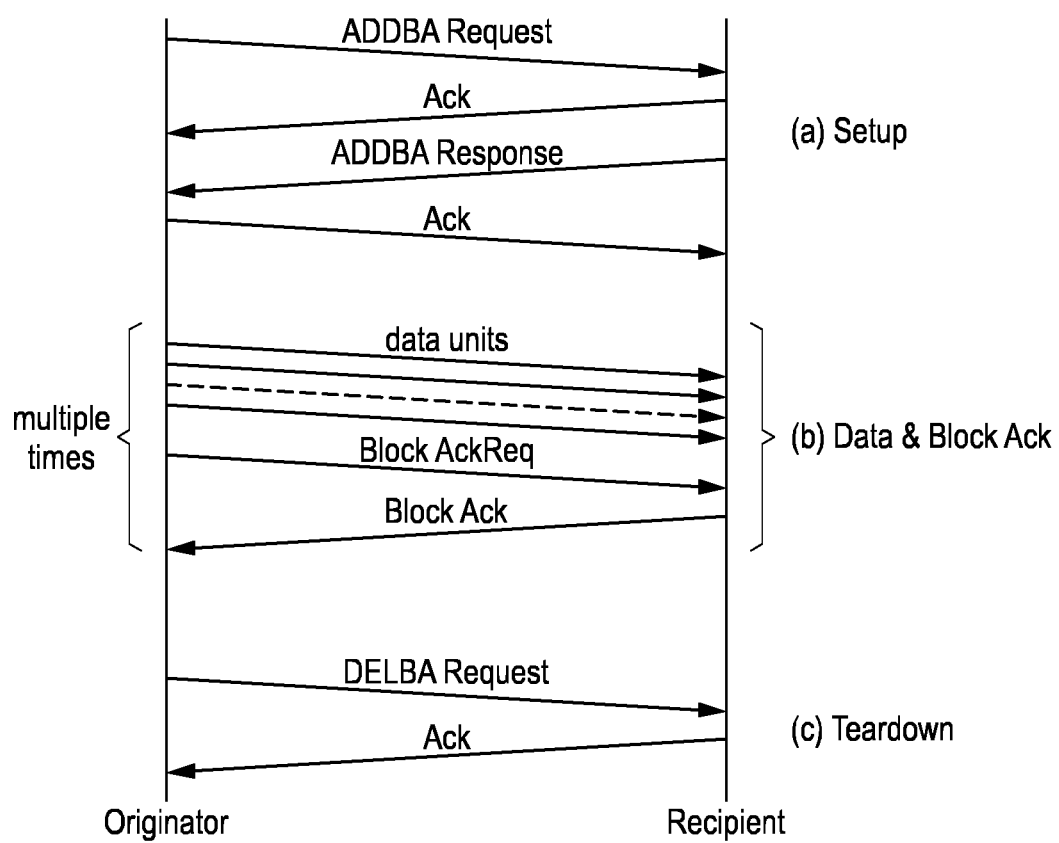
FIG. 17 shows a schematic diagram illustrating another embodiment of a method according to the present disclosure using block ack agreement, operation and teardown.

In an embodiment, the above described scheme works in conjunction with the BAck mechanism (shown e.g. in FIG. 17). In general, the operation of the BAck mechanism is unchanged except of the following: The originator maintains a scoreboard in which it marks transmitted data units but not the parity units. The recipient acknowledges successful reception of data units but not parity units. Any successfully reconstructed data unit shall be indicated to be successfully received.

Figure 14:
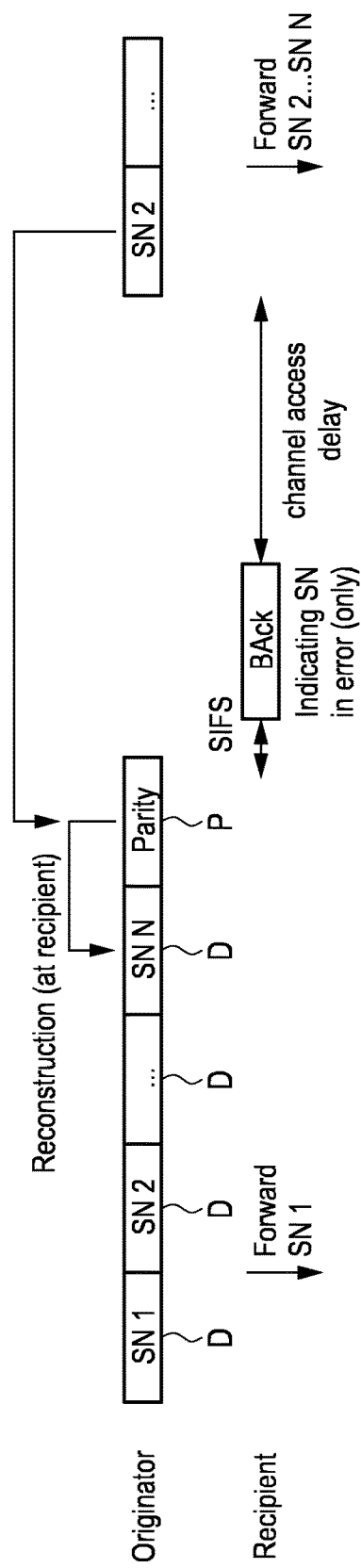
FIG. 14 shows a schematic diagram of another embodiment of the exemplary data flow according to the present disclosure enabling the correction of erasures.

There are, however, cases when the parity units are not sufficient to reconstruct all erroneously received data units within a block. In this case, according to one embodiment, retransmission of data units via the BAck mechanism may be requested. Since the previously received parity information already defines a relationship between data units, retransmission of only a few data units is required. It is sufficient to just request that many data units by which the reconstruction capability of the parity units is met or exceeded. This is illustrated in FIG. 14 showing a schematic diagram of another embodiment of the exemplary data flow according to the present disclosure enabling the correction of erasures.

For the originator to determine an appropriate amount of parity units or the parity rule to be applied, it requires the exchange or agreement of information about channel conditions between originator and recipient. For this reason, the BAck should include information about the PER before and/or after reconstruction of data units. In case the current parity rule is inappropriate, either originator or recipient may establish a new BAck agreement (optionally) after teardown of the current (old) agreement.

The generation and decoding of a parity unit shown in FIGS. 7 and 12 assumes a binary redundancy rule, i.e. the summation is done modulo 2 which may be implemented by a XOR connection of each bit of data units (half-adder hardware structure). This has the drawback that for M>1, the number of data units which may be reconstructed is less than M.

Figure 15:
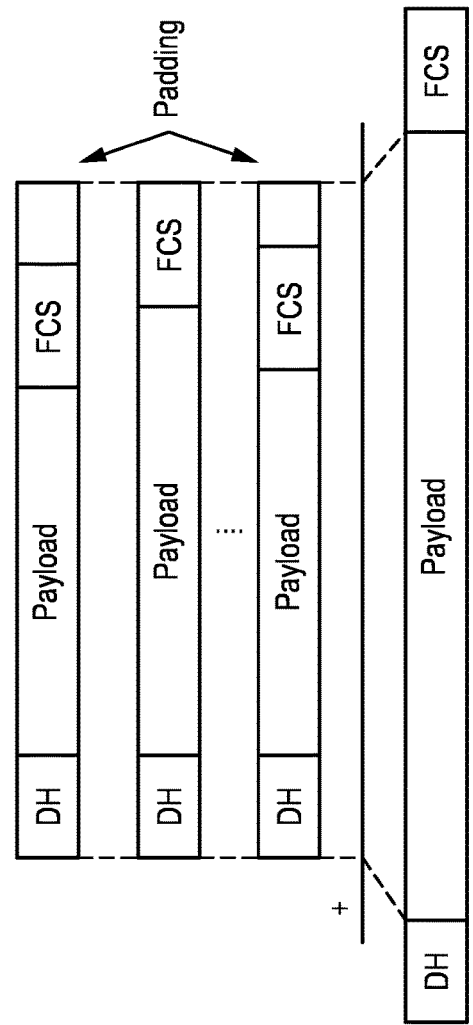
FIG. 15 shows a schematic diagram illustrating another embodiment for the generation of a parity data unit according to an embodiment of the present disclosure.

To overcome this drawback, a non-binary redundancy rule may be applied in another embodiment as illustrated in FIG. 15 showing a schematic diagram illustrating another embodiment for the generation of a parity data unit according to an embodiment of the present disclosure. According to this embodiment each data unit is portioned into consecutive and non-overlapping groups or words of Q bits. Each word is interpreted as an integer and words of different data units are connected via regular summation to form a parity unit. Since regular summation is done, the number of bits to represent the integer number of a parity unit word has larger size, i.e. requires more bits to be represented. Assuming summation of R words each having Q bits results in a parity data word of size R+Q bits. Also full-adder hardware structures are required for non-binary operation compared to half-adder structure in binary case. In principle any choice of Q may be envisioned, but Q={8, 16, 32, 64, 128} is reasonable for implementation. A large Q is desired to keep payload growth of a parity unit small.

An example for binary parity encoding and decoding is described in the following. N=4 data units of same length shall be protected by M=3 parity units. The exemplary redundancy rule is $$P = \begin{pmatrix} 0 & 1 & 1 & 1 \\ 1 & 1 & 1 & 0 \\ 1 & 0 & 1 & 1 \end{pmatrix}$$

The encoding process according top $\vec{p} = P\vec{x}$ gives $p_1 = x_2 + x_3 + x_4$, $p_2 = x_1 + x_2 + x_3$, $p_3 = x_1 + x_3 + x_4$. The originator transmits $[\vec{x}\,\vec{p}]$, i.e. the interleaver implements simple concatenation which is transmitted in an aggregate.

The reconstruction of two erasure patterns is exemplarily described in the following.
  i. It is assumed that data units $x_1$ and $x_4$ and parity unit $p_3$ are erroneously received. The decoder may reconstruct $x_4 = p_1 + x_2 + x_3$ and $x_1 = p_2 + x_2 + x_3$. Parity unit $p_3$ does not require reconstruction and may be discarded.
  ii. It is assumed that data unit $x_1$, $x_3$, and $x_4$ are erroneously received. The decoder may reconstruct $x_1 = p_1 + p_3 + x_2$, $x_3 = p_2 + x_1 + x_2$, and $x_4 = p_3 + x_1 + x_3$ which requires an iterative approach, i.e. reconstructed data units are reused to reconstruct other data units.

Figure 16:
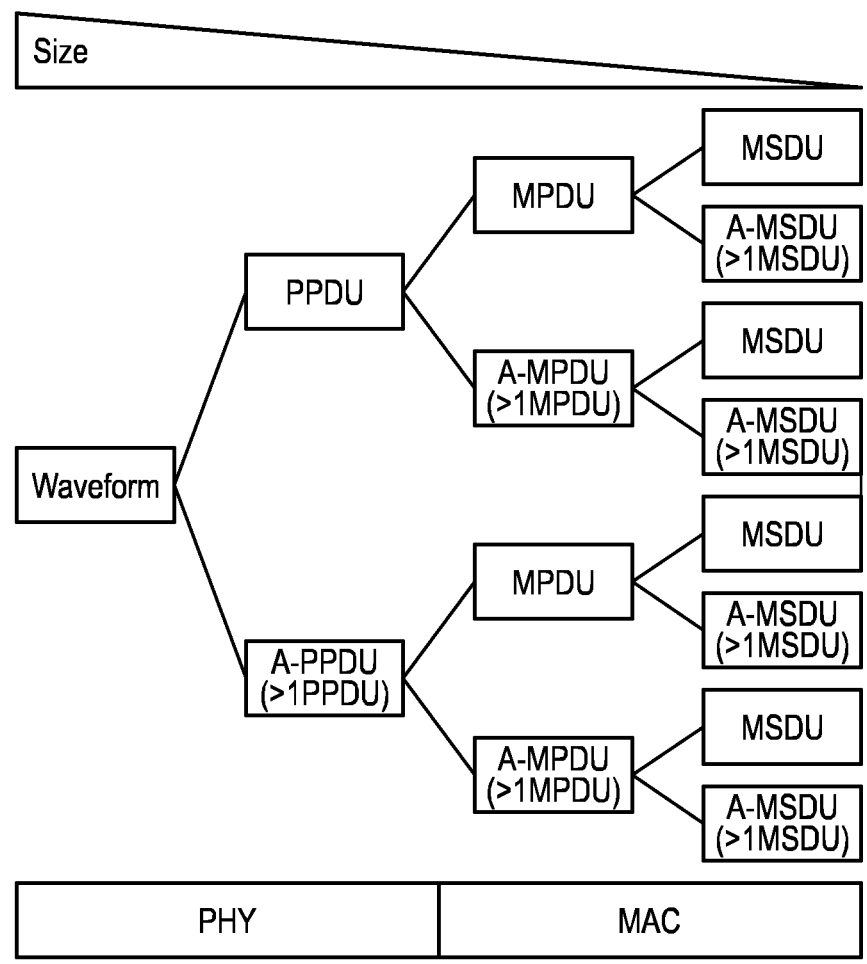
FIG. 16 shows a schematic diagram illustrating aggregation mechanisms in WLAN.

In WLAN terminology, a data unit is considered to be an MPDU, a user data frame is a MSDU or an A-MSDU. More than one MPDU (=MSDU or A-MSDU) are aggregated to an A-MPDU. On the PHY layer a MPDU or A-MPDU is transmitted in a PPDU. Several MPDUs or A-MPDUs may be transmitted in an A-PPDU. In an A-PPDU, the PHY layer may be configured differently (e.g. different coding or modulation)for each PPDU in this aggregate. FIG. 16 gives an overview of the aggregation mechanisms in WLAN. The A-PPDU mechanism is available for 60 GHz WLAN (802.11ad/ay) only. Furthermore, FIG. 3 shows the location of the proposed erasure coding on lower MAC layer of WLAN.

For WLAN, the following rules should hold for a parity block (see FIG. 5). Those rules allow simple receiver implementation while keeping restrictions low.
  A parity block starts right at the beginning of a data unit aggregation (A-MPDU).
  A parity block ends with the end of a data unit aggregation (A-MPDU).
  A parity block shall not extend over multiple data unit aggregations unless it is an aggregation on PHY layer (A-PPDU).
  (optional) Management and control frames are not to part of a parity block and are not considered for computation of parity units.

FIG. 17 shows a schematic diagram illustrating another embodiment of a method according to the present disclosure. This diagram gives an overview of the BAck mechanism including three phases (a) setup, (b) regular operation, and (c) teardown. The parity unit configuration and BAck session properties are negotiated in phase (a) with exchange of ADDBA request and response frames between originator and responder. The operation as described above takes place in phase (b). Phase (c) terminates the BAck session.

Binary redundancy rules (for mod2 addition) may comprise:

i. $P = (1 \; \ldots \; 1)$ a matrix of size $1 \times N$ ii. $P = \begin{pmatrix} 1 & \ldots & 1 & 1 \\ 1 & \ldots & 1 & 0 \end{pmatrix}$ a matrix of size $2 \times N$ ($N \geq 2$)

iii. $P = \begin{pmatrix} 1 & 0 & 1 & 0 & 1 & \ldots \\ 0 & 1 & 0 & 1 & 0 & \ldots \end{pmatrix}$ a matrix of size $2 \times N$ ($N \geq 2$)

iv. $P = \begin{pmatrix} 1 & \ldots & 1 & 1 & 0 \\ 1 & \ldots & 1 & 0 & 1 \end{pmatrix}$ a matrix of size $2 \times N$ ($N \geq 3$)

v. $P = \begin{pmatrix} 1 & \ldots & 1 & 1 & 1 & 0 \\ 1 & \ldots & 1 & 0 & 0 & 1 \end{pmatrix}$ a matrix of size $2 \times N$ ($N \geq 5$)

vi. $P = \begin{pmatrix} 1 & \ldots & 1 & 1 & 1 & 0 & 0 \\ 1 & \ldots & 1 & 0 & 0 & 1 & 1 \end{pmatrix}$ a matrix of size $2 \times N$ ($N \geq 6$)

vii. $P = \begin{pmatrix} 1 & \ldots & 1 & 1 & 1 & 1 & 0 & 0 \\ 1 & \ldots & 1 & 0 & 0 & 0 & 1 & 1 \end{pmatrix}$ a matrix of size $2 \times N$ ($N \geq 8$)

viii. $P = \begin{pmatrix} 1 & 1 & 0 \\ 1 & 0 & 1 \\ 0 & 1 & 1 \end{pmatrix}$ ix. $P = \begin{pmatrix} 1 & 1 & 1 & 0 \\ 1 & 1 & 0 & 1 \\ 1 & 0 & 1 & 1 \end{pmatrix}$ used in an example explained above x. $P = \begin{pmatrix} 1 & 1 & 1 & 0 & 1 \\ 1 & 1 & 0 & 1 & 1 \\ 1 & 0 & 1 & 1 & 0 \end{pmatrix}$ Rows and columns of any P may be permuted without decoding performance loss. Modifications to the third (iii) P, however, are required to keep the property that neighboring data units influence different parity data units for not changing decoding performance. In general, P matrices have dimensions MxN.

The above mentioned redundancy rules have been optimized for decoding performance in binary regime (i.e. mod2 addition). Those rules, except (iii), enable the receiver to reconstruct a maximum number of erasures in arbitrary positions. For M=1, all single erasures may be reconstructed. For M=2, all single erasures and 75 to 80% (depending on N) of all double erasures in arbitrary position may be reconstructed. For M=3, all single, all double and 83 to 85% (depending on N) of all triple erasures in arbitrary position may be reconstructed. In contrast, the redundancy rule (iii) may reconstruct all single and all neighboring double erasures. However, due to the absence of reconstruction capability of double erasures in arbitrary position, only 56 to 67% (depending on N) of all double erasures in arbitrary position may be reconstructed. Thus, the best choice of redundancy rule includes consideration of frequent erasure patterns.

The parity check matrix P from example (i) performs a single parity check (SPC) among all N data units (bit by bit, i.e., in FIG. 15 for each column, one parity bit is computed by the mod-2 checksum (for binary code) vertically). Hence, the parity rule is a single parity check rule, generating one (M=1) parity unit. With this parity rule, exactly one erasure can be corrected (erasure here meaning one erased data unit).

In general, to correct at least t erasures, a code is needed, which has minimum Hamming distance $d_{min} = t+1$ (known from coding theory). For example, to correct t=2 erasures, $d_{min}=3$ is required. This can be achieved by classical Hamming codes (not flexible, since they only exist for certain settings of M and N) or by BCH codes (and possibly other codes).

For the intended scenario, another solution is possible to correct two erasures. Since one FEC word (from PHY layer) usually comprises two adjacent data units (i.e. there is no strict coupling between PHY resources and MAC blocks, so in most cases the FEC word does not end exactly at the end of one data unit), one erroneous FEC word will affect an erasure in two neighboring data units. This scenario is described above and illustrated in FIGS. 9 and 10 in detail.

The rows in FIG. 7 may be denoted from top down as 1, 2, . . . , N−1 for the data units (each data unit is one row). Then, two neighboring data units will always lie in one even row and one odd row number. Thus, the matrix from example (iii) will allow correcting two adjacent erasures. This matrix corresponds to the parity rule that generates two (M=2) parity units, wherein the first parity unit is a single parity check over all even data units, and the second parity unit is a single parity check over all odd data units. This parity rule has only $d_{min}=2$, but still allows correcting two erasures: the erased even data unit can be reconstructed by all other (corrected) data units together with the even single parity check (SPC) checksum, and the odd data unit can be reconstructed accordingly by all other (corrected) data units together with the odd SPC checksum. In case, only one erasure is detected (for the coincidental case, where one FEC word ends at the border of one data unit), then the sum of even and odd SPC yield the SPC of all rows, i.e., the same results as the matrix from example (i). Thus, this encoding helps correcting easily one or two erasures with minimum overhead. This can be achieved by the parity matrix P (iii), where the upper row forms a modulo-2 sum of all even entries, while the lower row forms a modulo-2 sum of all odd entries.

The above-described examples assume linear codes, which can be generated via matrix multiplication. Furthermore, the examples assume systematic codes, where the generator matrix includes the identity matrix (to copy the uncoded bits to the codeword) in addition to the parity matrix, defining how the parity bits are generated. For more general cases, the codes can also be non-systematic (uncoded bits not part of codeword) and/or non-linear (codewords are not generated by linear algebra, but by other means, e.g. a look-up-table).

In summary, the proposed parity encoding is a further code (another FEC) dealing with erasures. Raw data units (comprising CRC (FCS)) are FEC (e.g. LDPC) encoded on PHY layer and are protected by parity units. Raw parity units comprise second FEC parity information as payload to further safeguard data units after FEC and CRC decoding. The raw parity unit is protected by CRC (FCS) and FEC (e.g. LDPC) on PHY layer.

The parities are data units generated by a second FEC encoder. The parity is always included in the transmission stream after being negotiated via BACK agreement unless new BACK agreement is done. For operation of the second FEC it may be useful to provide some statistical information (e.g. PER before and/or after the second FEC).

The BAck behavior is unchanged except that BAck scoreboard is after erasure correction (e.g. status of back scoreboard after MPDU erasure correction). Furthermore, parities are not acknowledged, meaning they cannot be retransmitted. In other words, differences to the BACK procedure defined in 802.11 standard and amendments (up to 802.11ax, 802.11ay), may include i) the parities are not acknowledged ii) not all erroneously received data units are to be retransmitted iii) scoreboard is after erasure correction (e.g. status of back scoreboard after MPDU erasure correction).

Motivation for performing erasure protection on the MAC layer is
- the sequence numbers of data units are already available (there is no need to add sequence number data on a higher layer);
- sequence number control for reconstruction is already available (there is no need to implement any reconstruction rule, error handing on higher layer, or buffer control);
- erasure coding is tightly bound to BAck mechanism, i.e. non-correctable erasures are retransmitted with high priority and low latency (the higher layer cannot do this; a higher layer BAck would be treated as regular low priority data; the higher layer has to accept data as is, no low-latency chance to ask for retransmission).

The present disclosure provides one or more of the following advantages: low latency data communications, low residual packet error rate, less retransmissions, enhanced performance in multi-user scenarios, e.g. multicast, broadcast, MU-MIMO, and seamless integration in BAck mechanism of WLAN.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage. The expression "one of more of A and B" as used herein shall generally be understood as i) A or ii) B or iii) A and B.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A transmission apparatus for use in a communication system, said transmission apparatus comprising:

MAC layer processing circuitry configured to encode, on a MAC layer, N data units, each comprising payload data, into M parity units, each comprising parity data allowing the reconstruction of one or more erroneous data units among said N data units in a receiver apparatus, according to a parity rule, the N data units and the corresponding M parity units representing a parity block, and to form a MAC layer data stream from the data units and the parity units of the parity block, and PHY layer processing circuitry configured to encode, on a PHY layer, bits of the MAC layer data stream into codewords of a code and to form a PHY layer data stream from the codewords.

2. The transmission apparatus as defined in any preceding embodiment, wherein said MAC layer processing circuitry is further configured to pad the N data units by padding data to have a same length before encoding them into the M parity data units.

3. The transmission apparatus as defined in embodiment 2, wherein said MAC layer processing circuitry is further configured to interleave the data units and the parity units of the parity block and to form the MAC layer data stream from the interleaved data units and parity units.

4. The transmission apparatus as defined in any preceding embodiment, wherein said MAC layer processing circuitry is further configured to allocate the data units and the parity units of the MAC layer data stream to different PHY layer resources, such as different frequencies and/or spatial streams generated by beamforming and/or spatial separation and/or polarization multiplex.

5. The transmission apparatus as defined in any preceding embodiment, wherein said MAC layer processing circuitry is further configured to apply binary encoding (including padding and requiring a fixed size) or non-binary encoding (providing a variable size and more error correcting) to the N data units to generate the M parity units.

6. The transmission apparatus as defined in any preceding embodiment, wherein a data unit comprises a data header comprising one or more of information about the type of data unit, transmission apparatus and receiving apparatus address, duration information indicating duration of the data unit and sequence number of the data unit, a payload portion comprising the payload data including one or more of user data, management data and control data, and a frame check sequence comprising a checksum over the data unit except the frame check sequence.

7. The transmission apparatus as defined in any preceding embodiment, wherein a parity data unit comprises a parity header comprising one or more of an identifier identifying the parity unit, the length of the parity unit and/or of the aggregate N data units and/or of the parity block, transmission apparatus and receiving apparatus address, parity information indicating the applied parity rule and parity sequence information indicating the index of the parity unit, a parity payload portion comprising the parity data, and a parity frame check sequence comprising a checksum over the parity unit except the frame check sequence.

8. The transmission apparatus as defined in any preceding embodiment, wherein said MAC layer processing circuitry is further configured to arrange a delimiter between two subsequent data units and/or between two subsequent parity units and/or between two subsequent parity blocks.

9. The transmission apparatus as defined in embodiment 8, wherein said MAC layer processing circuitry is further configured to add information into the delimiters indicating if the subsequent unit is a data unit or a parity unit and/or if the subsequent unit is the beginning of a new parity block.

10. The transmission apparatus as defined in any preceding embodiment, wherein the transmission apparatus is configured to agree with the receiving apparatus or inform the receiving apparatus on the parity rule, the numbers of N and M and the interleaver configuration or to determine them by evaluating the capabilities of the receiving apparatus.

11. A transmission method for use in a communication system, said transmission method comprising:

MAC layer processing including encoding, on a MAC layer, N data units, each comprising payload data, into M parity units, each comprising parity data allowing the reconstruction of one or more erroneous data units among said N data units in a receiver apparatus, according to a parity rule, the N data units and the corresponding M parity units representing a parity block, and forming a MAC layer data stream from the data units and the parity units of the parity block, and PHY layer processing including encoding, on a PHY layer, bits of the MAC layer data stream into codewords of a code and forming a PHY layer data stream from the codewords.

12. A receiving apparatus for use in a communication system, said receiving apparatus comprising:

PHY layer processing circuitry configured to derive codewords of a code from a received PHY layer data stream and to decode, on a PHY layer, the codewords into bits of a MAC layer data stream, and MAC layer processing circuitry configured to derive from the MAC layer data stream N data units, each comprising payload data, and corresponding M parity units, each comprising parity data, the N data units and the M parity units forming a parity block, to detect erasures in the N data units, and to reconstruct, on a MAC layer, according to a parity rule one or more data units by use of the parity units if an erasure has been detected in one or more data units.

13. The receiving apparatus as defined in embodiment 12, wherein said MAC layer processing circuitry is further configured to pad the error-free data units by padding data to have a same length before reconstructing an erroneous data unit and to remove the padding data from the error-free data units after the reconstruction of the erroneous data unit.

14. The receiving apparatus as defined in embodiment 12 or 13, wherein said MAC layer processing circuitry is further configured to deallocate the data units and the parity units from PHY layer resources onto the MAC layer data stream.

15. The receiving apparatus as defined in any one of embodiments 12 to 14, wherein said MAC layer processing circuitry is further configured to apply binary decoding or non-binary decoding to reconstruct an erroneous data unit.

16. The receiving apparatus as defined in any one of embodiments 12 to 15, wherein said MAC layer processing circuitry is further configured to send a request for retransmission of an erroneous data unit if the erroneous data unit cannot be reconstructed by use of the M parity data units.

17. The receiving apparatus as defined in any one of embodiments 12 to 16, wherein said MAC layer processing circuitry is further configured to perform block acknowledgement of a series of data units, wherein the data units are only acknowledged and/or wherein information about the status of erasures of each data unit after reconstruction is included in the acknowledgement and/or wherein information about a data unit error rate before reconstruction and/or before and after reconstruction is included in the acknowledgement.

18. The receiving apparatus as defined in any one of embodiments 12 to 17, wherein said MAC layer processing circuitry is further configured to perform round robin block acknowledgement and/or to provide a block acknowledgement only after request by a transmission apparatus.

19. A receiving method for use in a communication system, said receiving method comprising:
PHY layer processing including deriving codewords of a code from a received PHY layer data stream and decoding, on a PHY layer, the codewords into bits of a MAC layer data stream, and
MAC layer processing including deriving from the MAC layer data stream N data units, each comprising payload data, and corresponding M parity units, each comprising parity data, the N data units and the M parity units forming a parity block, detecting erasures in the N data units, and reconstructing, on a MAC layer, according to a parity rule one or more data units by use of the parity units if an erasure has been detected in one or more data units.

20. A non-transitory computer-readable recording medium that stores therein a computer program product, which, when executed by a processor, causes the method according to embodiment 11 or 19 to be performed.

21. A computer program comprising program code means for causing a computer to perform the steps of said method according to embodiment 11 or 19 when said computer program is carried out on a computer.

22. The transmission apparatus as defined in any one of embodiments 1 to 10, wherein the parity rule is a single parity check rule and is configured to generate one parity unit.

23. The transmission apparatus as defined in any one of embodiments 1 to 10, wherein the parity rule is configured to generate two parity units, wherein the first parity unit is a single parity check over all even data units, and the second parity unit is a single parity check over all odd data units.

24. The transmission apparatus as defined in any one of embodiments 1 to 10, wherein the parity rule is a binary rule using one of the following parity matrices:

i. $P = (1 \ \ldots \ 1)$ a matrix of size $1 \times N$ ii. $P = \begin{pmatrix} 1 & \ldots & 1 & 1 \\ 1 & \ldots & 1 & 0 \end{pmatrix}$ a matrix of size $2 \times N$ $(N \geq 2)$ iii. $P = \begin{pmatrix} 1 & 0 & 1 & 0 & 1 & \ldots \\ 0 & 1 & 0 & 1 & 0 & \ldots \end{pmatrix}$ a matrix of size $2 \times N$ $(N \geq 2)$ iv. $P = \begin{pmatrix} 1 & \ldots & 1 & 1 & 0 \\ 1 & \ldots & 1 & 0 & 1 \end{pmatrix}$ a matrix of size $2 \times N$ $(N \geq 3)$ v. $P = \begin{pmatrix} 1 & \ldots & 1 & 1 & 1 & 0 \\ 1 & \ldots & 1 & 0 & 0 & 1 \end{pmatrix}$ a matrix of size $2 \times N (N \geq 5)$ vi. $P = \begin{pmatrix} 1 & \ldots & 1 & 1 & 1 & 0 & 0 \\ 1 & \ldots & 1 & 0 & 0 & 1 & 1 \end{pmatrix}$ a matrix of size $2 \times N$ $(N \geq 6)$ vii. $P = \begin{pmatrix} 1 & \ldots & 1 & 1 & 1 & 1 & 0 & 0 \\ 1 & \ldots & 1 & 0 & 0 & 0 & 1 & 1 \end{pmatrix}$ a matrix of size $2 \times N$ $(N \geq 8)$ viii. $P = \begin{pmatrix} 1 & 1 & 0 \\ 1 & 0 & 1 \\ 0 & 1 & 1 \end{pmatrix}$ ix. $P = \begin{pmatrix} 1 & 1 & 1 & 0 \\ 1 & 1 & 0 & 1 \\ 1 & 0 & 1 & 1 \end{pmatrix}$ x. $P = \begin{pmatrix} 1 & 1 & 1 & 0 & 1 \\ 1 & 1 & 0 & 1 & 1 \\ 1 & 0 & 1 & 1 & 0 \end{pmatrix}$ 25. The receiving apparatus as defined in embodiment 18, wherein the block acknowledgement is time- and/or frequency- and/or space-interleaved with respect to the block acknowledgement of other receiving apparatuses 26. The receiving apparatus as defined in embodiment 17 or 18, wherein the block acknowledgement includes a request for retransmission of fewer erroneous data units than the number of received erroneous data units.

The invention claimed is:
1. A transmission apparatus for use in a communication system, the transmission apparatus comprising:
MAC layer processing circuitry configured to:
encode N data units on a MAC layer into M parity units according to a parity rule, wherein N is different than M, each data unit of the N data units comprises payload data, each parity unit of the M parity units comprises parity data allowing a reconstruction of one or more erroneous data units among the N data units in a receiver apparatus, and a parity block is represented by the N data units followed by the M parity units; and
form a MAC layer data stream from the N data units and the M parity units of the parity block; and
PHY layer processing circuitry configured to:
encode, on a PHY layer, bits of the MAC layer data stream into codewords of a code; and
form a PHY layer data stream from the codewords, wherein
each data unit, of the N data units, includes:
a data header comprising one or more of information about a type of data unit, transmission apparatus and receiving apparatus address duration information indicating duration of the data unit and sequence number of the data unit,
a payload portion comprising the payload data including one or more of user data, management data and control data, and
a frame check sequence comprising a checksum over the data header and the payload portion of the data unit.
2. The transmission apparatus as claimed in claim 1, wherein the MAC layer processing circuitry is further con- figured to pad the N data units by padding data to have a same length before encoding them into the M parity data units.

3. The transmission apparatus as claimed in claim 2, wherein the MAC layer processing circuitry is further configured to interleave the N data units and the M parity units of the parity block and to form the MAC layer data stream from the interleaved data units and parity units.

4. The transmission apparatus as claimed in claim 1, wherein the MAC layer processing circuitry is further configured to allocate the N data units and the M parity units of the MAC layer data stream to different PHY layer resources.

5. The transmission apparatus as claimed in claim 1, wherein the MAC layer processing circuitry is further configured to apply binary encoding or non-binary encoding to the N data units to generate the M parity units.

6. The transmission apparatus as claimed in claim 1, wherein a parity unit comprises:
   a parity header including one or more of:
      an identifier identifying the parity unit,
      information indicating a length of the parity unit, a length of the aggregate N data units, or a length of the parity block,
      transmission apparatus and receiving apparatus address,
      parity information indicating the applied parity rule, and
      parity sequence information indicating an index of the parity unit,
   a parity payload portion comprising the parity data, and
   a parity frame check sequence comprising a checksum over the parity header and the parity payload portion of the parity unit.

7. The transmission apparatus as claimed in claim 1, wherein the MAC layer processing circuitry is further configured to arrange a delimiter between two subsequent data units, between two subsequent parity units, or between two subsequent parity blocks.

8. The transmission apparatus as claimed in claim 7, wherein the MAC layer processing circuitry is further configured to add information into the delimiters indicating whether a subsequent unit is a data unit, whether the subsequent unit is a parity unit, or whether the subsequent unit is a beginning of a new parity block.

9. The transmission apparatus as claimed in claim 1 wherein the transmission apparatus is configured to agree with the receiving apparatus or inform the receiving apparatus on the parity rule, numbers of N and M and an interleaver configuration or to determine them by evaluating capabilities of the receiving apparatus.

10. A transmission method for use in a communication system, the transmission method comprising:
    performing a MAC layer processing including:
       encoding N data units on a MAC layer into M parity units according to a parity rule, wherein N is different than M, each data unit of the N data units comprises payload data, each parity unit of the M parity units comprises parity data allowing a reconstruction of one or more erroneous data units among the N data units in a receiver apparatus, and a parity block represented by the N data units followed by the M parity units; and
       forming a MAC layer data stream from the N data units and the M parity units of the parity block; and
    performing a PHY layer processing including:
       encoding, on a PHY layer, bits of the MAC layer data stream into codewords of a code; and
       forming a PHY layer data stream from the codewords, wherein
    each data unit, of the N data units, includes:
       a data header comprising one or more of information about a type of data unit, transmission apparatus and receiving apparatus address, duration information indicating duration of the data unit and sequence number of the data unit,
       a payload portion comprising the payload data including one or more of user data management data and control data, and
       a frame check sequence comprising a checksum over the data header and the payload portion of the data unit.

11. A receiving apparatus for use in a communication system, the receiving apparatus comprising:
    PHY layer processing circuitry configured to:
       derive codewords of a code from a received PHY layer data stream; and
       decode, on a PHY layer, the codewords into bits of a MAC layer data stream; and
    MAC layer processing circuitry configured to:
       derive N data units from the MAC layer data stream to detect erasures in the N data units, wherein N is different than M, each data unit of the N data units comprises payload data and corresponds to a parity unit of M parity units, each parity unit of the M parity units comprises parity data, and a parity block is represented by the N data units followed by the M parity units; and
       reconstruct, on a MAC layer and according to a parity rule, one or more data units by use of the correctly received parity units in a case that an erasure is detected in one or more data units, wherein
    each data unit, of the N data units, includes:
       a data header comprising one or more of information about a type of data unit, transmission apparatus and receiving apparatus address, duration information indicating duration of the data unit and sequence number of the data unit,
       a payload portion comprising the payload data including one or more of user data, management data and control data, and
       a frame check sequence comprising a checksum over the data header and the payload portion of the data unit.

12. The receiving apparatus as claimed in claim 11, wherein the MAC layer processing circuitry is further configured to pad error-free data units by padding data to have a same length before reconstructing an erroneous data unit and to remove the padding data from the error-free data units after the reconstruction of the erroneous data unit.

13. The receiving apparatus as claimed in claim 11, wherein the MAC layer processing circuitry is further configured to deallocate the N data units and the M parity units from PHY layer resources onto the MAC layer data stream.

14. The receiving apparatus as claimed in claim 11, wherein the MAC layer processing circuitry is further configured to apply binary decoding or non-binary decoding to reconstruct an erroneous data unit.

15. The receiving apparatus as claimed in claim 11, wherein the MAC layer processing circuitry is further configured to send a request for retransmission of an erroneous data unit in a case the erroneous data unit cannot be reconstructed by use of the M parity data units.

16. The receiving apparatus as claimed in claim 11, wherein the MAC layer processing circuitry is further configured to perform block acknowledgement of a series of data units, information about a status of erasures of each data unit after reconstruction is included in an acknowledgement, or information about a data unit error rate before reconstruction or after reconstruction is included in the acknowledgement.

17. The receiving apparatus as claimed in claim 11, wherein the MAC layer processing circuitry is further configured to provide a block acknowledgement only after request by a transmission apparatus.

18. A receiving method for use in a communication system, the receiving method comprising:
   performing a PHY layer processing including:
      deriving codewords of a code from a received PHY layer data stream; and
      decoding, on a PHY layer, the codewords into bits of a MAC layer data stream; and
   performing a MAC layer processing including:
      deriving N data units from the MAC layer data stream to detect erasures in the N data units, wherein N is different than M, each data unit of the N data units comprises payload data and corresponds to a parity unit of M parity units, each parity unit of the M parity units comprises parity data, and a parity block is represented by the N data units followed by the M parity units; and
      reconstructing, on a MAC layer and according to a parity rule, one or more data units by use of the M parity units in a case that an erasure is detected in one or more data units, wherein
   each data unit, of the N data units, includes:
      a data header comprising one or more of information about a type of data unit, transmission apparatus and receiving apparatus address, duration information indicating duration of the data unit and sequence number of the data unit,
      a payload portion comprising the payload data including one or more of user data, management data and control data, and
      a frame check sequence comprising a checksum over the data header and the payload portion of the data unit.

19. A non-transitory computer-readable recording medium that stores therein a computer program product, which, when executed by a processor, causes the transmission method according to claim 10 to be performed.

* * * * *